United States Patent
Nishizawa

(10) Patent No.: US 8,139,279 B2
(45) Date of Patent: Mar. 20, 2012

(54) MOVABLE BODY APPARATUS, OPTICAL DEFLECTOR, AND OPTICAL INSTRUMENT USING THE OPTICAL DEFLECTOR

(75) Inventor: Hideta Nishizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 12/205,388

(22) Filed: Sep. 5, 2008

(65) Prior Publication Data
US 2009/0097088 A1    Apr. 16, 2009

(30) Foreign Application Priority Data

Oct. 3, 2007    (JP) .................................. 2007-259300

(51) Int. Cl.
*G02B 26/08* (2006.01)
(52) U.S. Cl. .................................................. 359/224.1
(58) Field of Classification Search .... 359/198.1–199.4, 359/200.6–200.8, 202.1, 221.2, 223.1–225.1, 359/226.2, 290–295, 838, 846, 871, 872; 250/204, 559.06, 559.29, 230, 234; 347/255–260; 353/39, 98–99; 385/15–18, 22; 398/12, 398/19, 45
See application file for complete search history.

(56) References Cited

U.S. PATENT DOCUMENTS

| 4,686,363 A * | 8/1987 | Schoon .......................... 250/235 |
| 2007/0035799 A1 * | 2/2007 | Gomi et al. .................... 359/214 |
| 2008/0106776 A1 * | 5/2008 | Suzuki et al. ................. 359/199 |

* cited by examiner

*Primary Examiner* — Jennifer L. Doak
(74) *Attorney, Agent, or Firm* — Fitzpatrick, Cella, Harper & Scinto

(57) ABSTRACT

A movable body apparatus includes a vibratory system, a driving portion for driving the vibratory system, a detecting portion for detecting a resonance frequency of the vibratory system, a drive controlling portion, and a storing portion. The vibratory system has a resonance frequency, and includes at least a movable body capable of being reciprocally, rotatably oscillated. The drive controlling portion regulates a driving frequency of a drive signal applied to the driving portion, based on the resonance frequency of the vibratory system. The storing portion stores the frequency detected by the detecting portion at a first predetermined time. The drive controlling portion regulates the driving frequency with reference to the stored frequency, at a second predetermined time after the storing portion stores the frequency, and executes a drive control of the vibratory system.

4 Claims, 11 Drawing Sheets

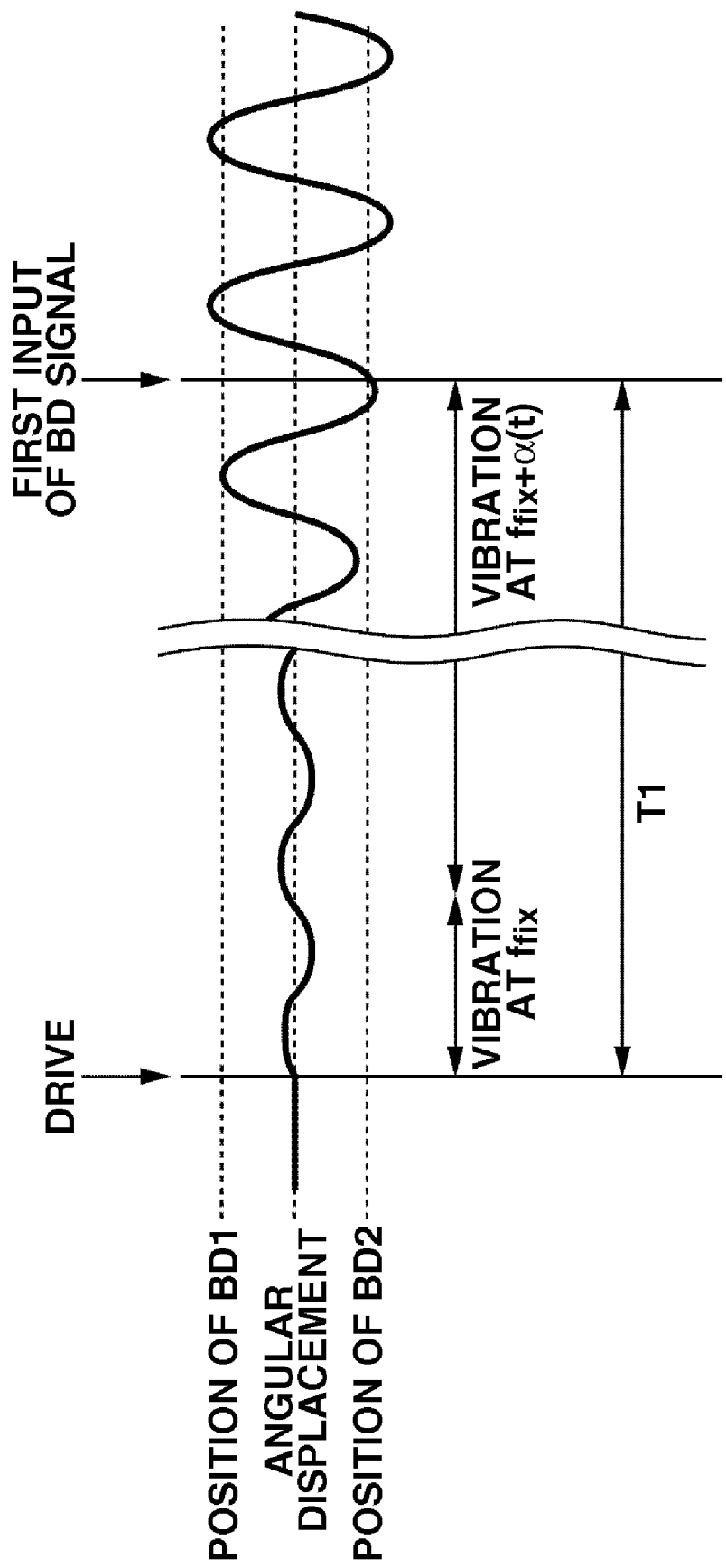

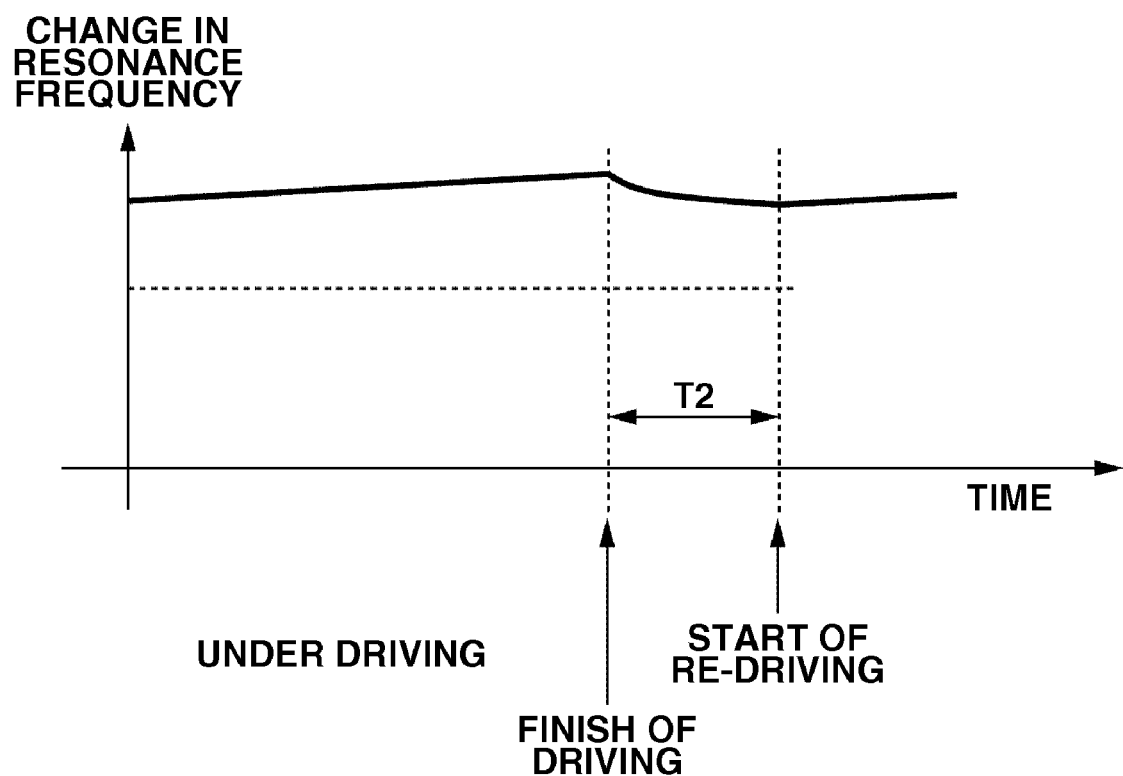

MOVABLE BODY APPARATUS, OPTICAL DEFLECTOR, AND OPTICAL INSTRUMENT USING THE OPTICAL DEFLECTOR

BACKGROUND OF THE INVENTION

1. Field of the Invention

The present invention relates to a movable body apparatus, such as a resonance-type movable body apparatus, including a vibratory system with a movable body, an optical deflector using the movable body apparatus, and an optical instrument using the optical deflector. Particularly, the present invention relates to a movable body apparatus that advantageously controls the driving frequency of a drive signal for driving a movable body. The optical deflector using the movable body apparatus can be preferably used in optical instruments, such as image displaying apparatuses like a scanning-type display, and electrophotographic image forming apparatuses like a laser beam printer (LBP) and a digital copying machine.

2. Description of the Related Art

Conventionally, a rotary polygonal mirror is used as an optical deflector in an image forming apparatus. In recent years, an optical deflector with a mirror capable of vibration in a resonance manner is proposed for the purpose of replacing the rotary polygonal mirror thereby. Such an optical deflector has advantages as follows. Compared to an optical deflector using the rotary polygonal mirror, the size can be greatly reduced. The consumption electrical power also can be reduced. There theoretically exists no problem of so-called face tangle. In particular, with such an optical deflector formed of a Si single crystal capable of being fabricated by a semiconductor processing method, no metal fatigue exists theoretically, and the endurance property is typically excellent.

FIG. 9A illustrates the construction of a driving circuit for an optical deflector generally usable in an image forming apparatus using the resonance-type optical deflector. Japanese Patent Application Laid-Open No. 2006-221030 A discloses such a driver. In this construction, which is illustrated in FIG. 9A, a light beam from a light beam generator 23 is deflected by a deflecting mirror 20, and the light beam is scanned in a main scanning direction that is a longitudinal axial direction of a photosensitive body 24. A drive signal generating circuit 21 applies a drive signal of voltage across a coil 22 to generate a magnetic field. The magnetic field interacts with a magnetic field from a magnet arranged on the deflecting mirror 20. Thus, a torque acts on and vibrates the deflecting mirror 20. The amplitude of the vibration of the deflecting mirror 20 gradually increases at a drive start time. A portion of the photosensitive body 24 is exposed by the light beam scanned in the main scanning direction, and this exposure is performed according to an image whose printing is requested.

Beam detectors 25 and 26 (simply referred to as BD in this specification) are disposed on both sides of the photosensitive body 24. From a time (light beam detection time) at which the light beam impinges on the BDs 25 and 26, an angular displacement measuring circuit 28 can measure a deflection amount of the light beam (i.e., the amount of an angular displacement of the deflecting mirror 20). An image forming circuit 27 controls the light beam generating circuit 23, based on a signal from the angular displacement measuring circuit 28 and data stored in an image memory 200 through a communication interface (I/F) 201.

With respect to the drive signal generated by the above-described drive signal generating circuit 21, driving can be executed most efficiently by a drive signal with a resonance frequency, which the deflecting mirror 20 has as its property. A desired angular displacement of the deflecting mirror 20 can also be obtained. The resonance frequency, however, has a temperature-dependent property as illustrated in FIG. 9B. Accordingly, to generate a drive signal with a resonance frequency, it is necessary to measure the relationship between information of the angular displacement of the deflecting mirror 20 and the drive signal.

As the measuring method, there exists a method of measuring the relationship based on a change in phase difference between a phase of the drive signal and a phase of the angular displacement signal (see Japanese Patent Application Laid-Open No. 2002-78368 A). In other words, a resonance frequency detecting circuit 203 detects the phase difference between the drive signal generated by the drive signal generating circuit 21 and the amount of the angular displacement detected by the angular displacement measuring circuit 28, and the circuit 203 obtains a resonance frequency based on a change in the phase difference.

In the above-described construction, at a drive start time, such as a time when an electrical power source is switched on, a system controller 202 supplies drive start signals to the drive signal generating circuit 21, the image forming circuit 27, and a storing portion 29, respectively. At this moment, the drive signal generating circuit 21 generates a drive signal, with an initial frequency stored in the storing portion 29, as a preset value. After the drive start, the drive signal generating circuit 21 alters the frequency of the drive signal within a variable range of the resonance frequency until signals are input into the BDs 25 and 26, so that the angular displacement of the deflecting mirror 20 can be obtained.

FIG. 10 illustrates a manner how of the drive control of the deflecting minor 20 is performed at the drive start time. The drive control of the mirror 20 starts at a preset frequency $f_{fix}$. After that, the driving frequency is linearly changed according to a time-changing function $\alpha(t)$. When the angular displacement amplitude of the mirror 20 is increased to a magnitude at which the signal can be input into the BD, a feedback drive control at a steady operating time begins to be executed while the resonance frequency is measured by the above-described method. FIG. 10 indicates a time T1 of a period from the drive start time to the BD signal input time.

According to the above-described technology, in which the drive control is started with a drive signal with the frequency preset at the drive start time, the following disadvantageous phenomenon can occur. If the preset frequency is largely away from a resonance frequency of the deflecting mirror 20 at the drive start time, the angular displacement amplitude of the mirror 20 cannot increase sufficiently fast enough, even if the amplitude of the drive signal is increased. To increase the angular displacement amplitude, the driving frequency of the drive signal needs to be brought close to a resonance frequency at that time, as described above. In the above case, however, it takes a considerable amount of time to bring the driving frequency to a frequency at which the angular displacement amplitude is well increased. Thus, it is difficult to quickly start a steady state operation, such as a first printing.

SUMMARY OF THE INVENTION

According to one aspect, the present invention provides a movable body apparatus including a vibratory system, a driving portion configured to drive the vibratory system, a detecting portion, a drive controlling portion, and a storing portion. The vibratory system has a resonance frequency, and includes at least a movable body capable of being reciprocally, rotatably oscillated about an axis. The detecting portion is adapted to detect a resonance frequency of the vibratory system. The drive controlling portion is adapted to regulate a driving frequency of a drive signal applied to the driving portion, based on the resonance frequency of the vibratory system. The storing portion is adapted to store the frequency detected by the detecting portion at a first predetermined time (for example, a drive finish time, such as a stand-by state and a time when the electrical power source is shut off). In the stand-by state, it is possible that a drive signal with a driving frequency remote from the resonance frequency is applied to the driving portion. The drive controlling portion is adapted to regulate the driving frequency with reference to the stored frequency, at a second predetermined time (for example, a drive start time or a re-driving start time) after the storing portion stores the frequency, and execute a drive control of the vibratory system.

According to another aspect, the present invention provides an optical deflector, including the above-described movable body apparatus, and a light beam generator configured to generate a light beam. The movable body apparatus is provided with a mirror configured to reflect and to deflect the light beam from the light beam generator. The detecting portion includes an optical detector arranged to detect the deflected light beam at a predetermined deflection angle. The resonance frequency is obtained based on a light beam detection time detected by the optical detector.

According to another aspect, the present invention provides an optical instrument including the above-described optical deflector, and an irradiation target object. The optical deflector deflects a light beam from the light beam generator, and directs at least a portion of the light beam to the irradiation target object.

According to another aspect, the present invention provides a drive control method including the steps as follows. The method performs a drive control of a movable body apparatus, including a vibratory system that has a resonance frequency, and includes a movable body, a detecting portion for detecting the resonance frequency of the vibratory system, and a driving portion for driving the vibratory system. The method includes a step of storing a frequency detected by the detecting portion at a drive finish time of the vibratory system, a step of measuring an elapse time from the drive finish time to a re-driving start time, and a step of executing a drive control of re-driving of the vibratory system starting with a drive signal with the stored frequency, in a case wherein the elapse time is shorter than a predetermined period of time.

According to another aspect, the present invention provides a drive control method including the steps as follows. The method performs a drive control of an image forming apparatus provided with a movable body apparatus including a vibratory system that has a resonance frequency, and includes a movable body, a detecting portion for detecting the resonance frequency of the vibratory system, and a driving portion for driving the vibratory system. The method includes a step of storing a frequency detected by the detecting portion at a time when the resonance frequency varies, and a step of executing a drive control of the vibratory system starting with a drive signal with the stored frequency, every time printing of a predetermined printing unit is completed.

According to the present invention, when a change in the ambient condition from a time when the frequency is stored is considered to be small, a drive control of the vibratory system is again executed, starting with a drive signal with a stored frequency. It is thereby possible to increase the likelihood that a drive signal with a frequency near the resonance frequency is generated at a drive start time. Hence, for example, in an apparatus using a movable body apparatus of the present invention, a period of time from a drive start time to a steady operating time can be made shorter than in conventional apparatuses.

Further features of the present invention will become apparent from the following description of exemplary embodiments, with reference to the attached drawings.

BRIEF DESCRIPTION OF THE DRAWINGS

FIG. 10 is a view illustrating an angular displacement of a deflecting mirror at a drive start time in conventional apparatuses.

FIG. 11 is a view illustrating a change in a resonance frequency of a deflecting mirror with time.

DESCRIPTION OF THE EMBODIMENTS

Embodiments of the present invention will hereinafter be described, with reference to the drawings.

Before describing the embodiments, a fundamental construction and operation of a movable body apparatus used in the present invention will be described with reference to FIGS. 8A and 8B.

Figure 8A:
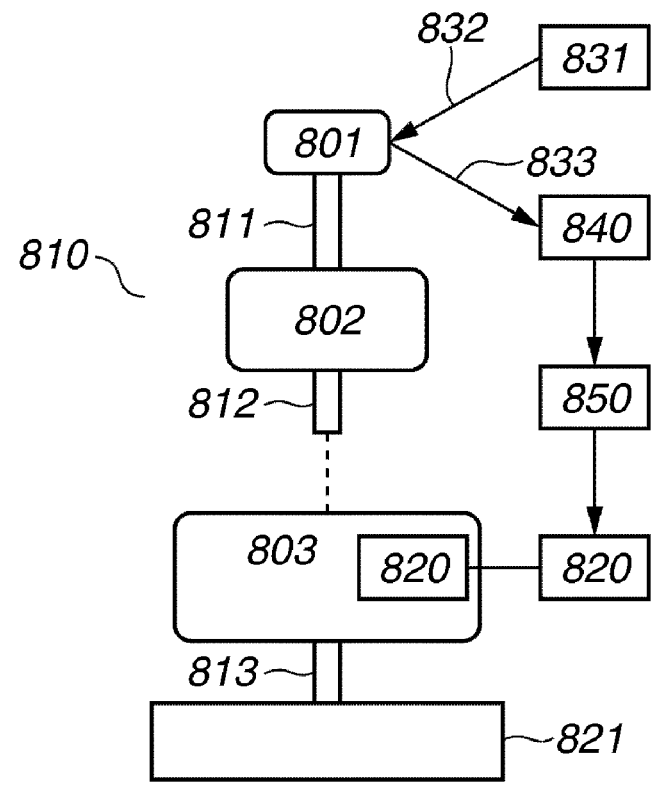
FIG. 8A is a view illustrating a fundamental construction of a movable body apparatus according to the present invention.
Figure 8B:
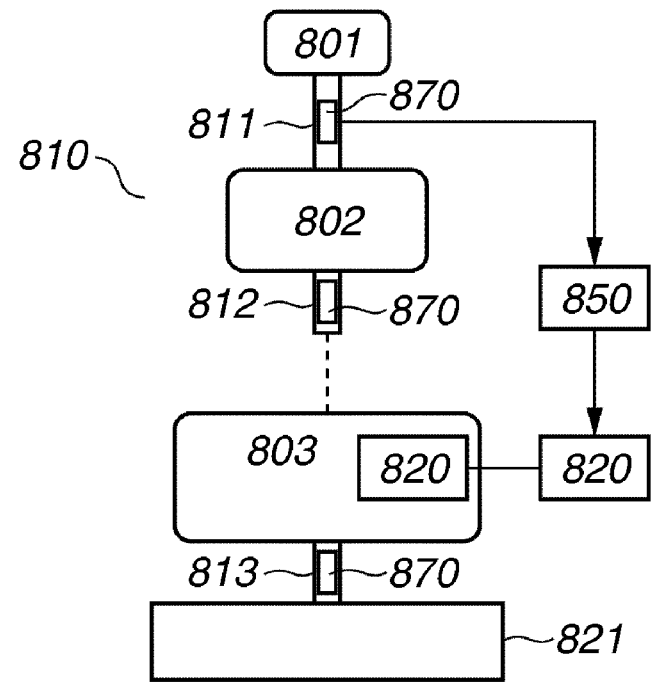
FIG. 8B is a view illustrating another fundamental construction of a movable body apparatus according to the present invention.

As illustrated in FIGS. 8A and 8B, a movable body apparatus includes a vibratory system 810 and a support portion 821 for supporting the vibratory system 810. The vibratory system 810 includes a first movable body 801, a second movable body 802, a first torsion spring 811, and a second torsion spring 812. The first torsion spring 811 connects the first movable body 801 to the second movable body 802. The second torsion spring 812 is connected to the second movable body 802 in such a manner that the second torsion spring 812 forms a twisting longitudinal axis common to that of the first torsion spring 811. The vibratory system 810 here only needs to include at least two movable bodies and at least two torsion springs. As illustrated in FIG. 8B, it can include three or more movable bodies 801, 802 and 803, and three or more torsion springs 811, 812 and 813. Furthermore, the movable body apparatus can include a vibratory system with a single movable body that is reciprocally rotatable about an axis.

The apparatus also includes a driving portion 820 that generates a drive force for driving the vibratory system 810, and a drive controlling portion 850 that controls the driving portion 820. The driving portion 820 drives the vibratory system 810 such that at least a movable body undergoes a vibrating motion represented by a formula of the sum of at least one periodical function. The drive controlling portion 850 supplies to the driving portion 820 such a drive signal that causes the above vibrating motion of the vibratory system 810.

When the movable body apparatus is used as an optical deflector, a reflective mirror is formed on at least a movable body. The reflective mirror is formed, for example, by forming an optical reflecting film on a surface of the movable body. When a surface of the movable body is sufficiently smooth, the movable body can be used as the reflective mirror without forming any optical reflecting film. The optical deflector further includes a light source 831 for emitting a light beam 832, and the light beam 832 is projected on the reflective mirror of the movable body 801. A light beam 833 deflected by the movable body 801 is thus scanned.

The operational principle of a movable body apparatus will be described. In general, an equation for free oscillation of a vibratory system with n movable bodies and n torsion springs will be given as follows.

$$M\ddot{\theta} + K\theta = 0$$

$$\theta = \begin{pmatrix} \theta_1 \\ \theta_2 \\ \vdots \\ \theta_n \end{pmatrix}, M = \begin{pmatrix} I_1 & & & \\ & I_2 & & \\ & & \ddots & \\ & & & I_n \end{pmatrix}, K = \begin{pmatrix} k_1 & -k_1 & & \\ -k_1 & k_1+k_2 & -k_2 & \\ & & \ddots & \\ & & -k_{n-1} & k_{n-1}+k_n \end{pmatrix}$$

where $I_k$ is the moment of inertia of the movable body, $k_k$ is the spring constant of the torsion spring, and $\theta_k$ is the torsion angle (angular displacement) of the movable body (k=1, ..., n).

If the eigen value of $M^{-1}K$ of this system is $\lambda_k$ (k=1, ..., n), the angular frequency $\omega_k$ in the characteristic vibratory mode is given by $\omega_k=\sqrt{(\lambda_k)}$.

In a movable body apparatus provided with a vibratory system including n movable bodies and n torsion springs with n vibratory modes, the movable body can perform various vibrating motions when the vibratory system is constructed such that a fundamental frequency and (n−1) integer-fold frequency (described below) or frequencies corresponding to a multiple, by an integral number, of the fundamental frequency are involved in the angular frequencies $\omega_k$. In this specification, "integer-fold" includes "approximately integer-fold", and "approximately integer-fold" covers a range between 0.98n of the fundamental frequency and 1.02n of the fundamental frequency.

Particularly, when a movable body apparatus including two movable bodies and two torsion springs is constructed such that a fundamental frequency and an approximately even number-fold frequency of the fundamental frequency are included in the angular frequencies $\omega_k$, fluctuation of the angular velocity of the movable body can be reduced in a predetermined range. Thus, approximately equi-angular velocity drive can be achieved.

Further, in the case of n=3, a vibratory system including three movable bodies 801, 802 and 803, and three torsion springs 811, 812 and 813 can be constructed such that the relationship of a frequency ratio between three characteristic vibratory modes is 1:2:3. When three characteristic vibratory modes are simultaneously excited in driving the vibratory system, fluctuation of the angular velocity can be further reduced, compared to the case of n=2. For example, the vibratory system can be driven in a manner in which the frequency ratio between the vibratory modes is set at 1:2:3, and a ratio of amplitudes between the vibratory modes is set at 24:−6:1.

As the number of vibratory modes is increased, a decrease in fluctuation of the angular velocity of the movable body in a predetermined range can be promoted.

Furthermore, when a vibratory system in a movable body apparatus with two movable bodies and two torsion springs is constructed such that a fundamental frequency and an approximately thrice frequency of the fundamental frequency are included in the angular frequencies $\omega_k$, the movable body can be driven in a manner in which the angular displacement of the movable body changes in the form of an approximately triangular wave.

The vibrating motion of a vibratory system with n movable bodies and n torsion springs, as illustrated in FIGS. 8A and 8B, will be described. In this vibratory system, a vibrating motion at a fundamental frequency and a vibrating motion at an approximately (n−1)-fold frequency of the fundamental frequency can be simultaneously excited. Accordingly, in one configuration, at least one of plural movable bodies is vibrated in a manner represented by a formula of the sum of at least one periodical function. This formula can include a constant term. For example, in the case of such a formula, a constant DC bias is applied to the driving portion to shift an origin (a position at which the angular displacement is zero) of the angular displacement of the movable body.

In another configuration, the angular displacement of a deflection angle $\theta$ of an optical deflector is as follows (the angle is measured from a reference position of a scanning center). The vibrating motion of a movable body is represented by a formula including at least a term of $A_1 \sin \omega t + A_2 \sin(n\omega t + \phi)$, where $A_1$ and $\omega$ are amplitude and angular frequency of a first vibratory motion, $A_2$ and $n\omega$ (n; integer) are amplitude and angular frequency of a second vibratory motion, and $\phi$ is the relative phase difference between phases of the first and second vibratory motions. Particularly, in the case of n=2, the formula includes at least a term $A_1 \sin \omega t + A_2 \sin(2\omega t + \phi)$, and it is possible to achieve an approximately equi-angular velocity drive in which fluctuation of the angular velocity of the movable body is reduced in a predetermined range. Further, in the case of n=3, the formula includes at least a term of $A_1 \sin \omega t + A_2 \sin(3\omega t + \phi)$, and it is possible to achieve an approximately triangular wave drive in which the angular displacement of the movable body changes in the form of a triangular wave. Also, in these cases, the formula can include a constant term.

In yet another configuration, the angular displacement of a deflection angle $\theta$ of an optical deflector is as follows. The vibrating motion of a movable body is represented by a formula of $\theta(t)=A_1 \sin \omega t + \Sigma A_n \sin(n\omega t + \phi_{n-1})$, where $A_1$ and $\omega$ are amplitude and angular frequency of a first vibratory motion, $A_n$ and $n\omega$ (n; integer) are amplitude and angular frequency of an n-th vibratory motion, and $\phi_{n-1}$ is the relative phase difference between phases of the first and n-th vibratory motions. As the number of movable bodies in the movable body apparatus is increased, the value of n can be increased. In the light of actual fabrication of the movable body apparatus, however, n is at most about three to five. In addition, in a movable body apparatus with a single movable body, the vibrating motion of the movable body can be represented by, for example, a formula of $\theta(t)=A \sin \omega t$ (n; integer).

The driving portion 820 has a construction capable of applying a drive force to the vibratory system 810 in an electromagnetic drive manner, an electrostatic drive manner, or a piezoelectric drive manner. In the electromagnetic manner, for example, at least a permanent magnet is disposed on the movable body, and a coil for applying a magnetic field to the permanent magnet is arranged near the movable body with the magnet. Locations of the permanent magnet and the coil can be exchanged. In the electrostatic drive manner, for example, at least an electrode is formed on the movable body, and another electrode for acting an electrostatic force on the electrode on the movable body is provided near the movable body. In the piezoelectric drive manner, for example, a piezoelectric device is disposed in the vibratory system or the support portion therefor to apply a drive force to the vibratory system.

The drive controlling portion 850 has a construction capable of generating a drive signal and supplying it to the driving portion 820, for the purpose of achieving the above-described vibrating motion of the vibratory system 810.

The drive signal can be, for example, a signal of sine-waves combined using a trigonometric function table, or a pulse signal generated based on the above signal of the combined sine-waves. In the case of the signal of the combined sine-waves, amplitude and phase of each sine-wave are adjusted to obtain a desired drive signal. In the case of the pulse signal, the number, interval, width, and the like, of pulses are changed with time pursuant to a predetermined principle, based on the signal of the combined sine-waves, to obtain a desired drive signal.

The movable body apparatus includes a detecting portion for supplying a signal generated according to the angular displacement of at least a movable body. In the configuration of FIG. 8A, the detecting portion includes the optical detector of a light receiving device 840. The light receiving device 840 is arranged so that the light beam 833 deflected by the movable body 801 can be detected at a position of a predetermined deflection angle. The detecting portion can measure a resonance frequency based on light beam detection times of the deflected light beam detected by the optical detector.

A piezoresistance 870 as illustrated in FIG. 8B can also be used as the detecting portion. In this case, the angular displacement amount of the movable body can be detected based on a signal from the piezoresistance 870. A resonance frequency can be measured based on the angular displacement amount. In this configuration, for example, the piezoresistance 870 is disposed in the torsion spring, and the detecting portion detects a time when the movable body takes a given angular displacement, based on the signal supplied from the piezoresistance 870. The piezoresistance 870 can be fabricated by, for example, diffusing phosphorus into a p-type single crystal silicon. The piezoresistance 870 outputs the signal according to the twisting angle or angular displacement of the torsion spring. Accordingly, when plural piezoresistances are respectively provided in plural torsion springs, and the angular displacement of the movable body is measured based on information of twisting angles of the plural torsion springs, the angular displacement of the movable body can be precisely measured.

In apparatuses and methods of the present invention, such as the above-described movable body apparatus, in order to increase the likelihood to generate a drive signal with a driving frequency close to the resonance frequency at times such as a drive start time, re-driving start time and drive control time, the following operation is executed.

At a first predetermined time (for example, a drive finish time when the drive control of the vibratory system is stopped, such as a stand-by state, and a time when an electrical power source is shut off), a frequency detected by the detecting portion is stored in the storing portion. The detecting portion detects the resonance frequency based on information of the angular displacement of the movable body. At a second predetermined time after the first predetermined time when the frequency is stored in the storing portion, the drive controlling portion is caused to regulate a driving frequency of a drive signal with reference to the stored frequency, and to execute the drive control. The drive controlling portion changes the driving frequency of the drive signal according to the resonance frequency of the vibratory system. The second predetermined time is, for example, a drive start time or a re-driving start time. When the movable body apparatus is used in an image forming apparatus, the first predetermined time can be a time when the resonance frequency changes. And, it is possible to cause the drive controlling portion to change the driving frequency to the stored frequency and to execute the drive control, at the second predetermined time when printing of a predetermined printing unit is completed.

An optical deflector can be constructed by using the above-described movable body apparatus and a light beam generator configured to generate a light beam. In the optical deflector, the movable body includes a mirror configured to reflect and to deflect the light beam from the light beam generator. The detecting portion includes an optical detector arranged to detect the light beam deflected at a predetermined deflection angle. The resonance frequency is obtained based on a light beam detection time detected by the optical detector.

Further, an optical instrument, such as an image displaying apparatus and an electrophotographic image forming apparatus, can be constructed by using the above-described optical deflector, and an irradiation target object. The optical deflector deflects the light beam from the light beam generator, and directs at least a portion of the light beam to the irradiation target object, such as a photosensitive body and a screen.

Further, a vibratory system in a movable body apparatus, which includes the vibratory system that has a resonance frequency, and includes a movable body, a detecting portion for detecting the resonance frequency of the vibratory system based on information of the angular displacement of the movable body, and a driving portion for driving the vibratory system, can be drive-controlled by a method as follows. The method includes a step of storing a frequency detected by the detecting portion at a drive finish time of the vibratory system, a step of measuring an elapse time from the drive finish time to a re-driving start time, and a step of executing a drive control of re-driving starting with a drive signal with the stored frequency, in a case wherein the elapse time is shorter than a predetermined period of time.

Further, a vibratory system in an image forming apparatus provided with a movable body apparatus, which includes the vibratory system that has a resonance frequency, and includes a movable body, a detecting portion for detecting the resonance frequency of the vibratory system based on information of the angular displacement of the movable body, and a driving portion for driving the vibratory system, can be drive-controlled by a method as follows. The method includes a step of storing a frequency detected by the detecting portion at a time when the resonance frequency changes, and a step of executing a drive control of the vibratory system starting with a drive signal with the stored frequency, every time printing of a predetermined printing unit is completed.

A first embodiment will be hereinafter described with reference to the drawings. In the first embodiment, the first predetermined time, when a frequency detected by the detecting portion is stored in the storing portion, is a drive finish time, such as a stand-by state, and a time when an electrical power source is shut off. The driving frequency is regulated or set with reference to the stored frequency at the second predetermined time, such as a drive start time and a re-driving start time, after the frequency is stored in the storing portion, and then, the drive control is executed.

Figure 1:
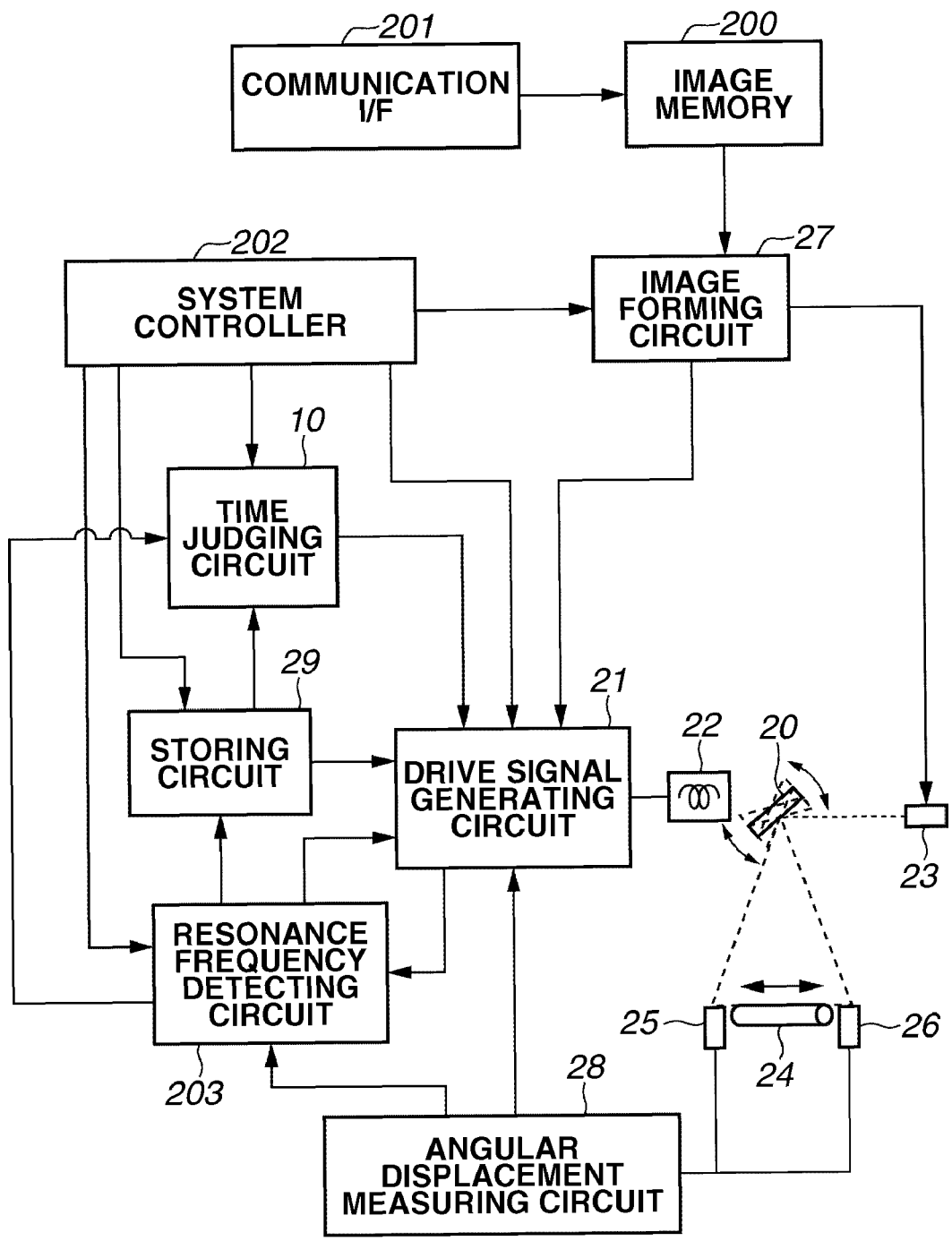
FIG. 1 is a view illustrating a driving circuit for an optical deflector of a first embodiment according to the present invention.
Figure 9A:
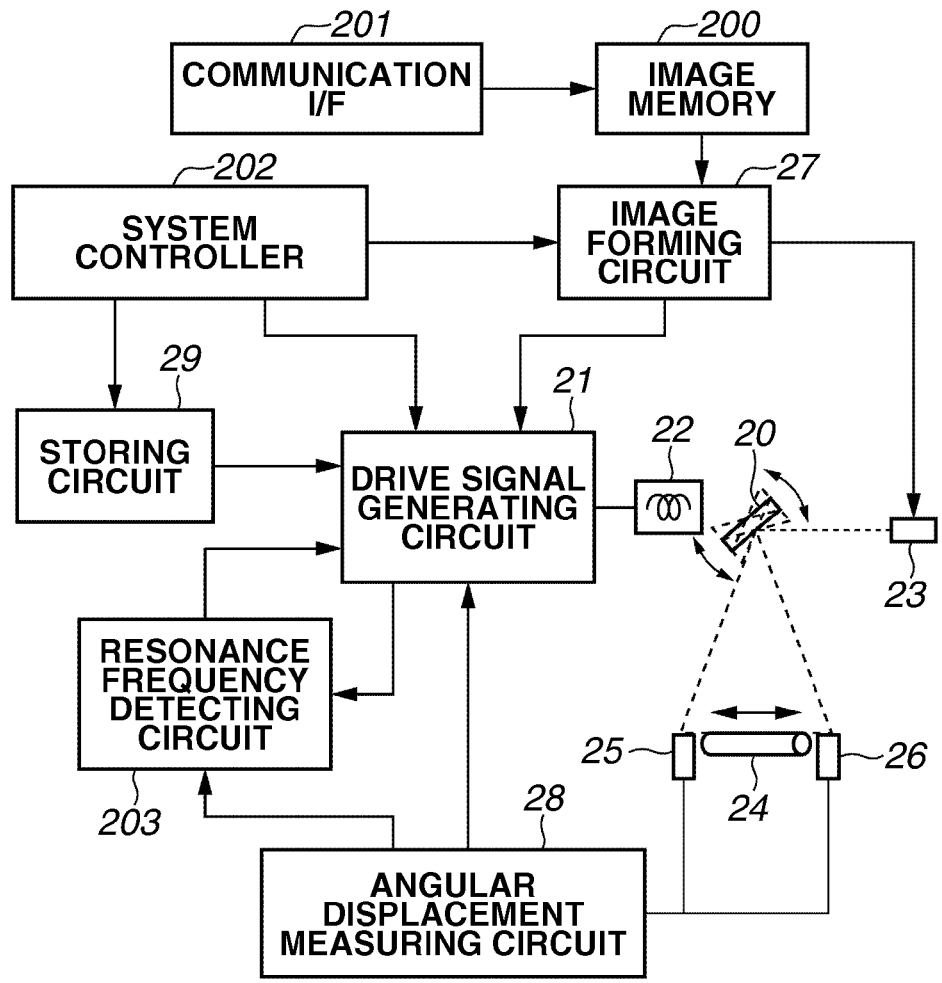
FIG. 9A is a view illustrating an example of a driving circuit for an optical deflector.
Figure 9B:
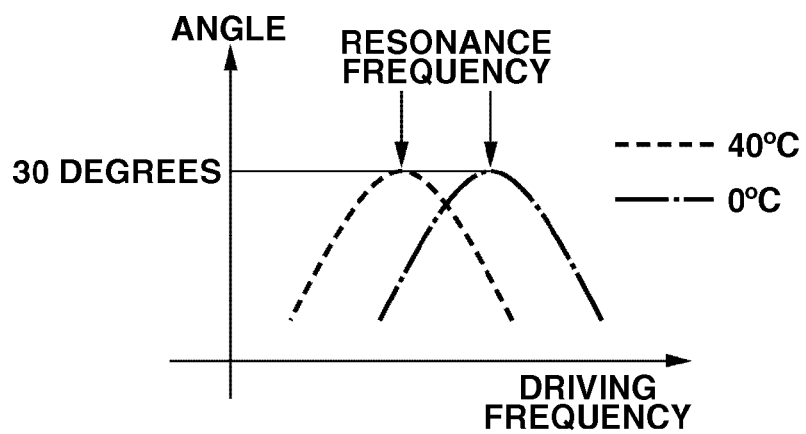
FIG. 9B is a graph explaining a temperature-dependent resonance frequency property of a deflecting mirror.

The configuration of a driving circuit for driving an optical deflector 20 in the first embodiment is illustrated in FIG. 1. Drive control of the deflecting mirror 20 for deflecting the light beam, measurement of the angular displacement by an angular displacement measuring circuit 28, measurement of the resonance frequency by a resonance frequency detecting circuit 203, and the like, are substantially the same as those described above referring to FIGS. 9A and 9B.

In the first embodiment, a system controller 202 supplies stop signals to respective circuits at a printing finish time. The resonance frequency measured by the resonance frequency detecting circuit 203 immediately before the stop signal is input thereinto is stored in a predetermined position of a storing circuit 29. Further, information of the predetermined position is supplied to a drive signal generating circuit 21, and a time when the printing finishes is supplied to a time judging circuit 10. The time judging circuit 10 measures an elapse time from the drive finish time to the re-driving start time.

Figure 3:
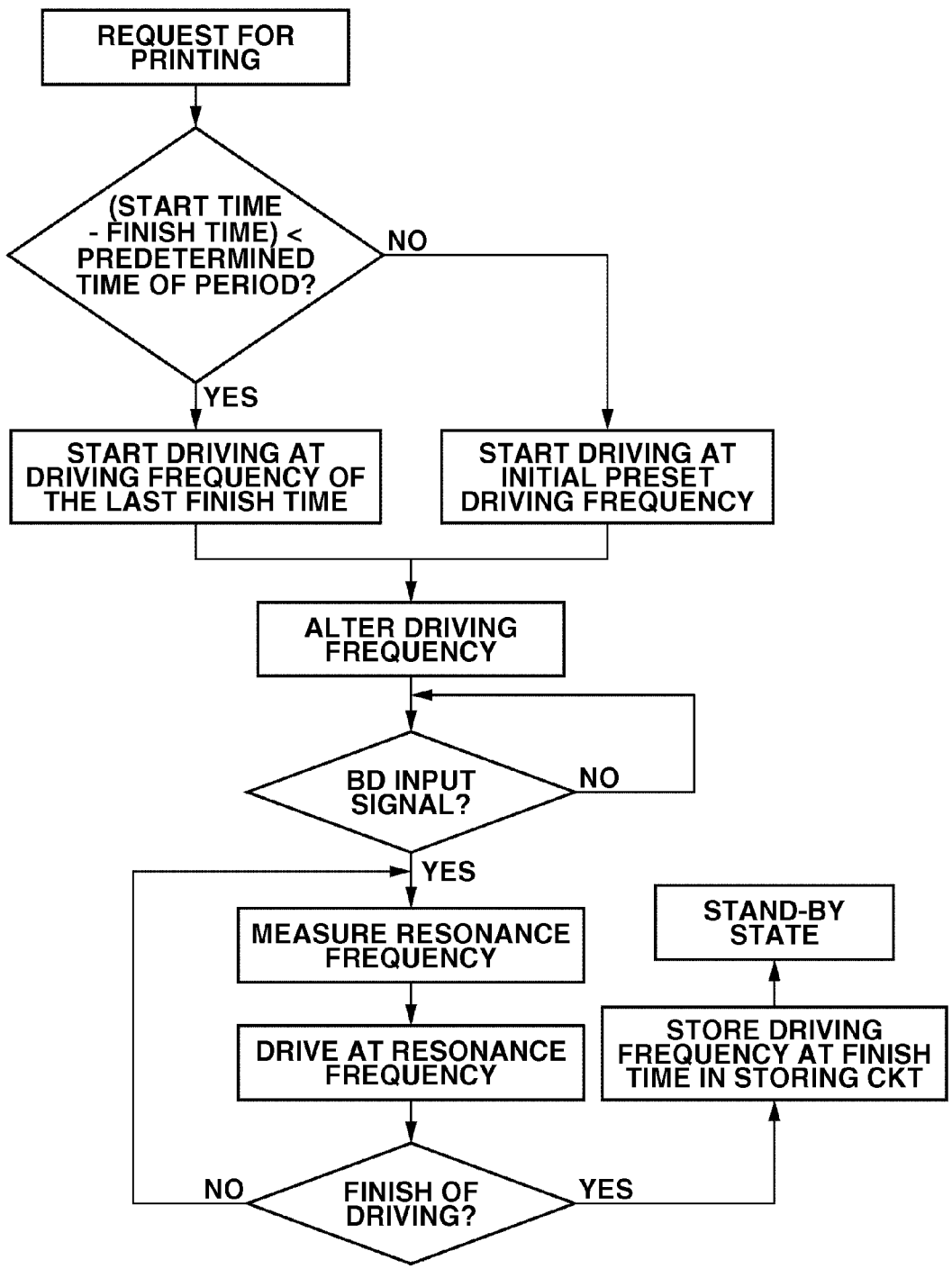
FIG. 3 is a flow chart explaining an operation of the first embodiment at a drive start time.

When a request for printing again occurs after the drive finish time, a request for a drive start is supplied from the system controller 202 to each circuit connected thereto. At this moment, in the time judging circuit 10, an interval T2 (see FIG. 11) between the last drive finish time and the re-driving start time is calculated, and the interval T2 is compared to a predetermined time $T_{nml}$. When T2 is shorter than $T_{nml}$, a time judging signal sent from the time judging circuit 10 to the drive signal generating circuit 21 is changed to an ON level. Upon receiving the ON level of the time judging signal, the drive signal generating circuit 21 reads the resonance frequency at the drive finish time from the predetermined position in the storing circuit 29. The re-driving start time here is a time when the electrical power source is turned from the OFF state to ON state, or a time when the deflecting mirror 20 is switched from a stand-by state, in which the mirror is not vibrated, to a drive condition. A flow chart of the above operation is shown in FIG. 3.

Figure 2:
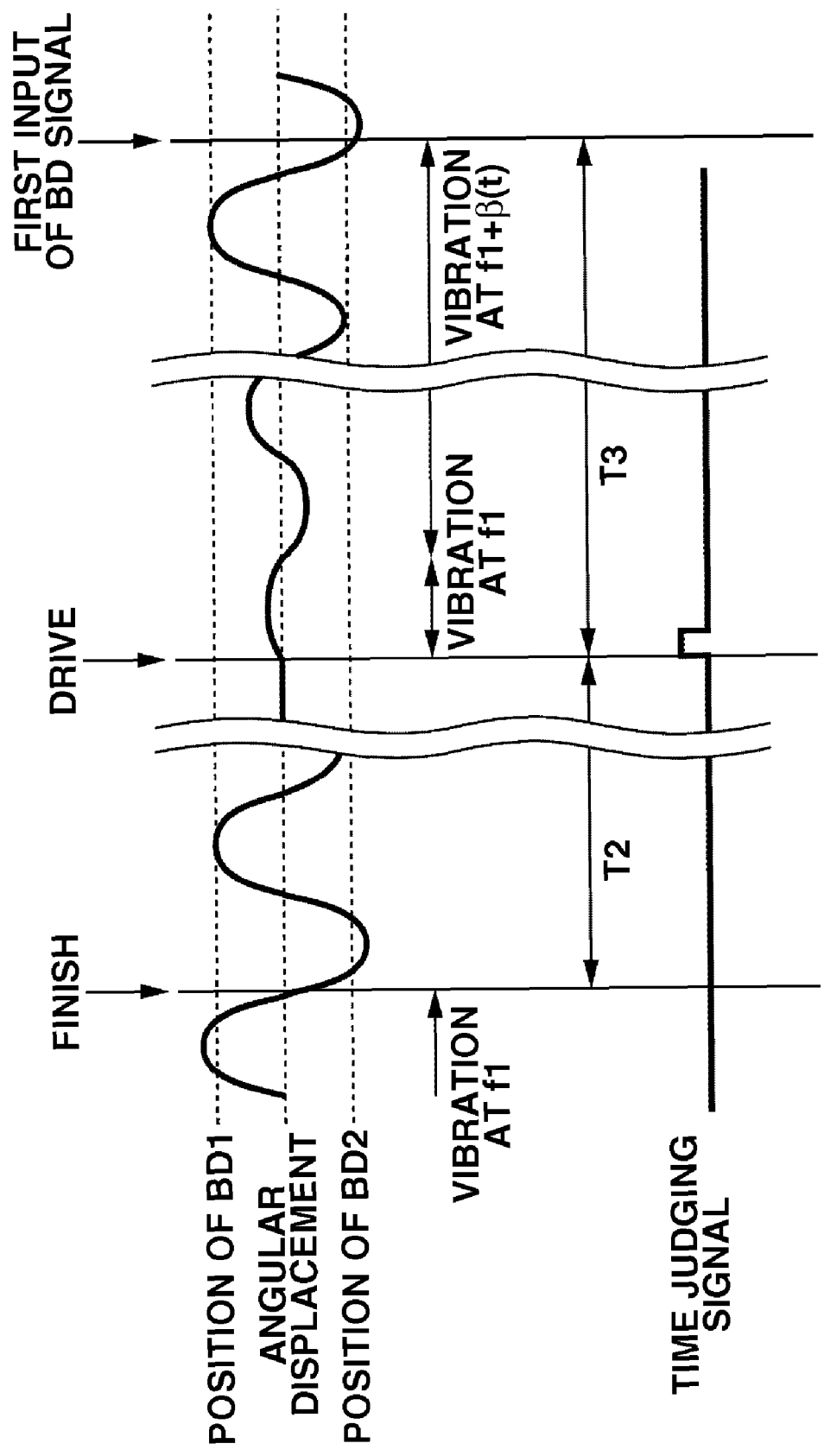
FIG. 2 is a view illustrating an angular displacement of a deflecting mirror at a drive start time in the first embodiment.

FIG. 2 illustrates the angular displacement of the deflecting mirror 20 in the first embodiment. As illustrated in FIG. 2, a supply of the drive signal from the drive signal generating circuit 21 is stopped upon receiving the request for a drive finish from the system controller 202. At this moment, a resonance frequency f1 detected by the resonance frequency detecting circuit 203 is stored in the storing circuit 29. After the stop of the drive signal supply, the angular displacement amplitude of the mirror 20 gradually decreases.

After that, when a request for printing is again generated, time T2 (for example, eight minutes) from the drive finish time to the printing request time is compared to the predetermined time $T_{nml}$ (for example, ten minutes). When the time from the drive finish time to the re-driving start time is short, a change in temperature from the drive finish time can be reasonably considered to be small. Accordingly a change in the resonance frequency can also be considered to be small. In this case, since T2 is shorter than the predetermined time $T_{nml}$, the time judging signal from the time judging circuit 10 is turned to the ON level, as mentioned above, and the drive control is started with a drive signal with the frequency f1 stored in the storing circuit 29. Thereafter, a drive signal with a frequency close to f1 is generated. Thus, when the elapse time from the drive finish time to the re-driving start time is shorter than a predetermined time, a drive controlling portion, including the drive signal generating circuit 21 and the system controller 202, executes the drive control with a drive signal with the stored frequency. In FIG. 2, β(t) is a function of time t, and the frequency of the minor vibration changes until the first input of BD signal occurs (see T3 in FIG. 2).

When T2 is longer than $T_{nml}$, the drive control is started with a drive signal with a preset frequency $f_{fix}$. After that, the drive control is executed with a drive signal with a frequency close to $f_{fix}$ (see the flow chart of FIG. 3).

According to the first embodiment, the driving frequency prior to the drive start time is stored. When it is judged that the angular displacement amplitude of the deflecting mirror can be increased when the drive control is started from the stored frequency faster than when the drive control is started from the preset frequency, the drive control is started from the stored frequency. It is thereby possible to reduce an interval from the drive start time to a steady state operating condition, as compared to conventional apparatuses.

A second embodiment will be described. In the second embodiment, the first predetermined time is a time when the resonance frequency changes. The driving frequency is regulated or set with reference to the stored frequency at the second predetermined time after the frequency is stored in the storing portion, and then, the drive control is executed. The second predetermined time here is a time when printing of a predetermined number of pages is completed. In other words, the driving frequency is regulated every time printing of a predetermined printing unit is completed.

Figure 4:
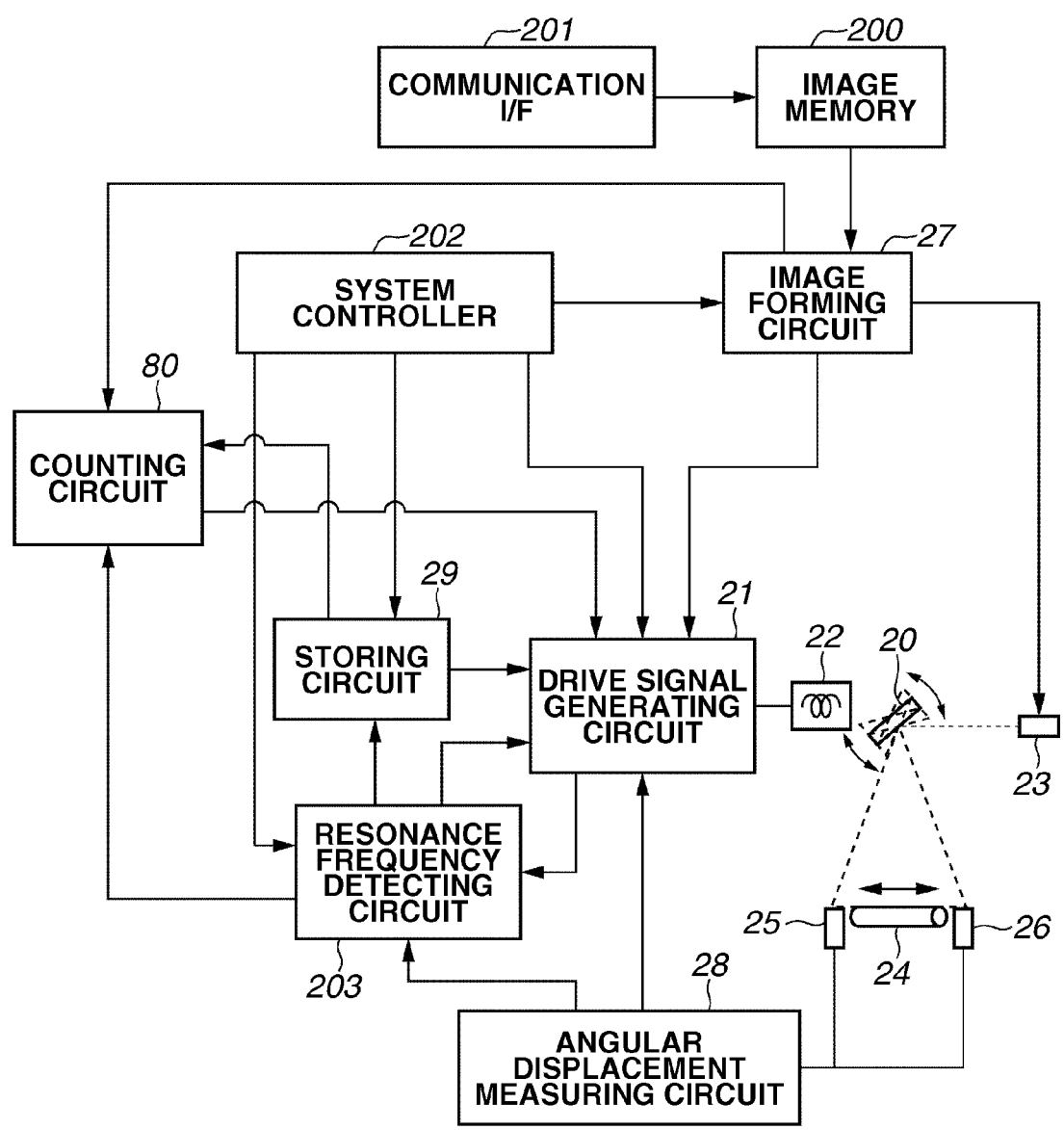
FIG. 4 is a view illustrating a driving circuit for an optical deflector of a second embodiment according to the present invention.

The configuration of a driving circuit for driving the optical deflector in the second embodiment is illustrated in FIG. 4. This configuration is different from that of the first embodiment in that the time judging circuit 10 is omitted, and a counting circuit 80 is provided.

Figure 6:
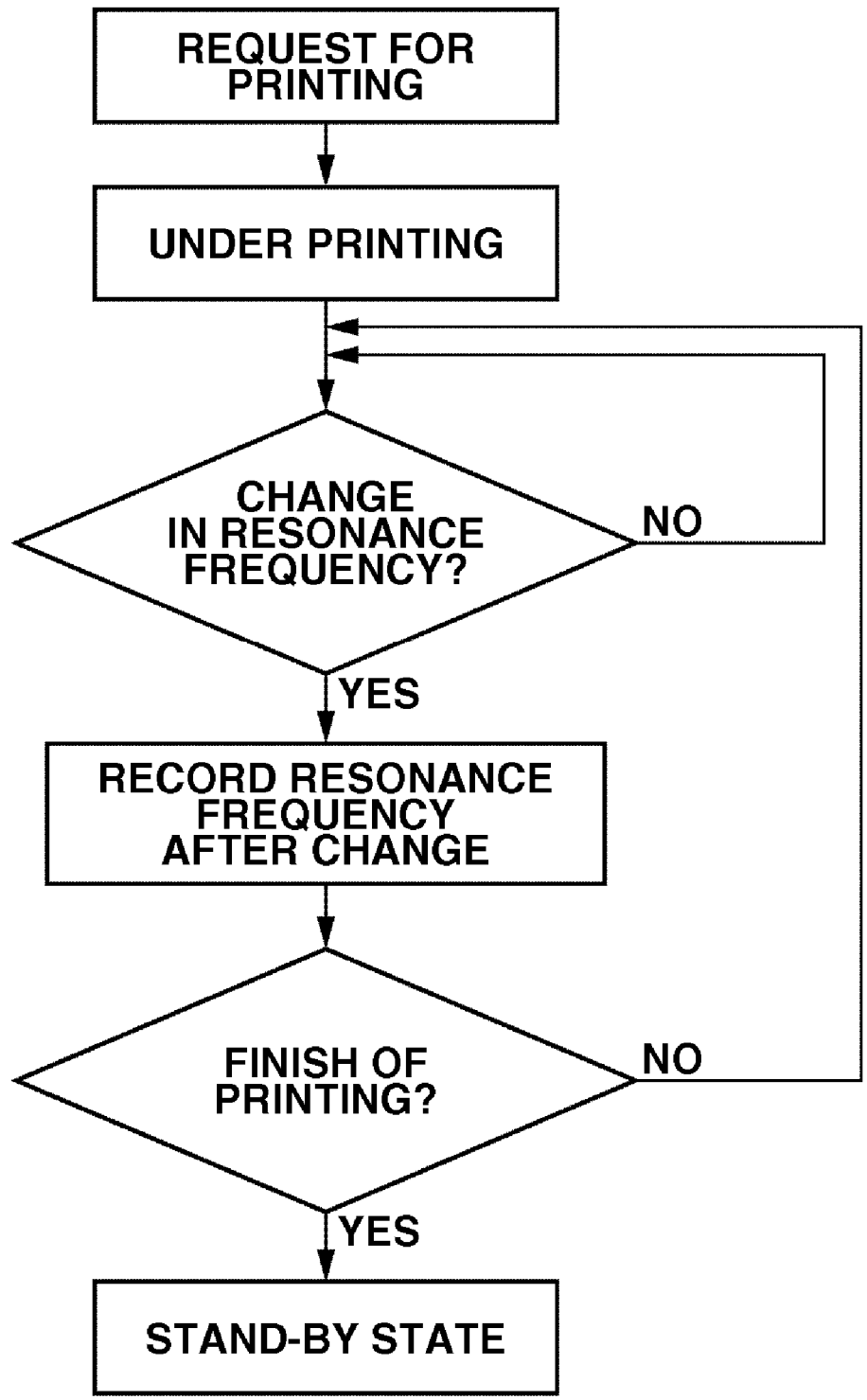
FIG. 6 is a flow chart explaining an operation of storing a resonance frequency in the second embodiment.

In the first embodiment, the resonance frequency is renewed at the printing finish time. In the second embodiment, the resonance frequency is stored in a predetermined position in the storing circuit 29 every time the resonance frequency changes. Further, information of the predetermined position is supplied to the drive signal generating circuit 21. A flow chart of this operation is shown in FIG. 6, which is discussed below.

Figure 7:
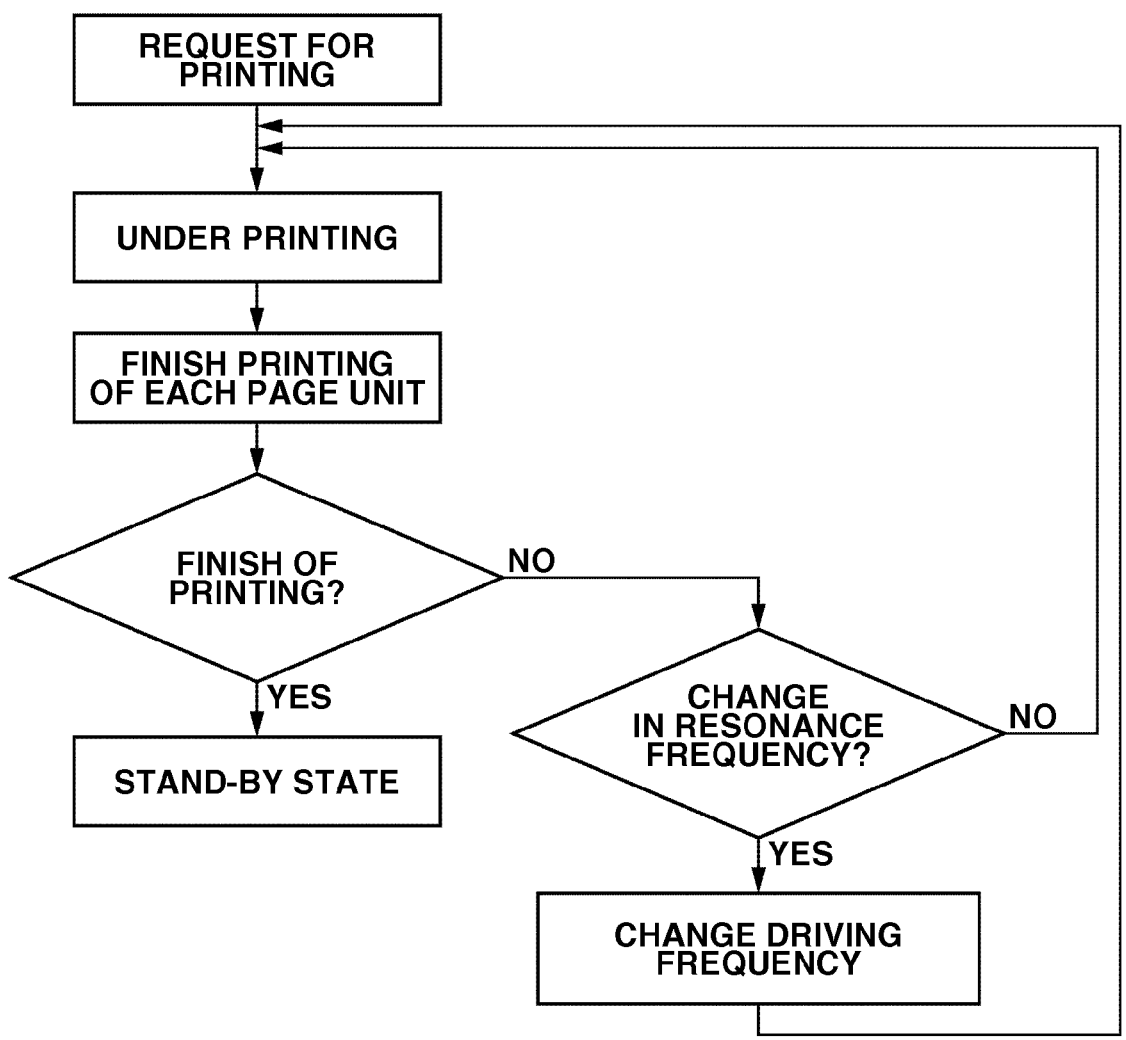
FIG. 7 is a flow chart explaining an operation of using a stored frequency in the second embodiment.

The counting circuit 80 counts the number of printed pages based on a signal from an image forming circuit 27. When a predetermined number stored in the storing circuit 29 is found to coincide with the number of printed pages, the counting circuit 80 checks a signal of a change in resonance frequency from a resonance frequency detecting circuit 203. The signal of a change in resonance frequency represents information of a presence (ON) or an absence (OFF) of a change in the resonance frequency. In the case of ON, the counting circuit 80 switches a signal of judging a predetermined number, which is connected to the drive signal generating circuit 21, from an OFF level to an ON level. Upon receiving the ON level of the signal of judging a predetermined number, the drive signal generating circuit 21 generates a drive signal with a frequency read from the predetermined position in the storing circuit 29. When the signal of a change in resonance frequency is found to take the OFF level, the drive control is continued without any change. A flow chart of this operation is shown in FIG. 7, which is discussed below.

Figure 5:
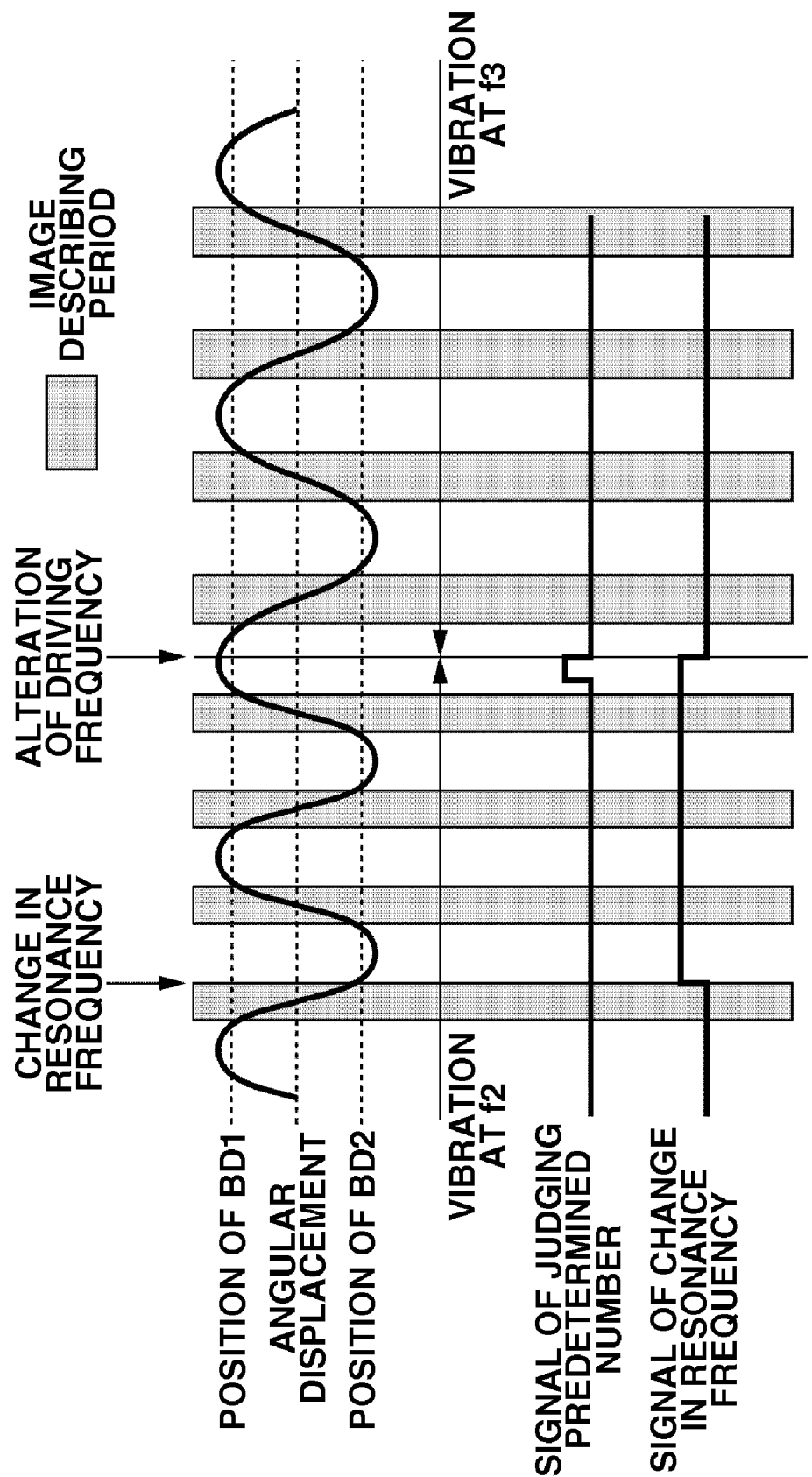
FIG. 5 is a view illustrating an angular displacement of a deflecting mirror in the second embodiment.

FIG. 5 shows the above-described operation, and illustrates the angular displacement of the deflecting mirror 20 in the second embodiment. As illustrated in FIG. 5, the signal of a change in resonance frequency is turned to the ON level immediately after the resonance frequency is found to change. At this moment, the change in the resonance frequency is not reflected on the drive signal, and the resonance frequency after the change is stored in the storing circuit 29. Further, when the count number in the count circuit 80 reaches the predetermined number, the signal of judging a predetermined number is turned to the ON level. In the event that the signal of judging a predetermined number is turned to the ON level under a condition in which the signal of a change in resonance frequency takes the ON level, the driving frequency f2 is altered to a frequency f3, stored in the storing circuit 29, within a non-image describing interval.

In the first embodiment, during the steady operating time, the driving frequency is feedback-controlled by the resonance frequency detecting circuit 203. In the second embodiment, however, during the steady operating time, the driving frequency is changed only at a time when the above-described condition is satisfied. Also, in the second embodiment, the time judging circuit can be provided, and frequency regulation and drive control similar to those in the first embodiment can be executed at the drive start time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Except as otherwise discussed herein, the various components shown in outline or in block form in the Figures are individually well known and their internal construction and operation are not critical either to the making or using, or to a description of the best mode of the invention.

This application claims the benefit of Japanese Patent Applications Nos. 2007-259300, filed Oct. 3, 2007, and 2008-201514, filed Aug. 5, 2008, which are hereby incorporated by reference herein in their entirety.

What is claimed is:

1. A movable body apparatus comprising:
a vibratory system, the vibratory system having a resonance frequency, and including at least a movable body capable of being reciprocally, rotatably oscillated;
a driving portion configured to drive the vibratory system, based on a drive signal applied to the driving portion, the drive signal having a driving frequency;
a detecting portion configured to detect the resonance frequency of the vibratory system;
a drive controlling portion configured to regulate the driving frequency of the drive signal applied to the driving portion, based on the resonance frequency of the vibratory system;
a storing portion configured to store the resonance frequency detected by the detecting portion when the drive controlling portion stops the drive signal; and
a measuring portion configured to measure an elapse time from a drive signal stopping time to a request for a drive start time,
wherein the drive controlling portion sets a driving frequency at the drive start time using the elapse time and the stored resonance frequency, and
wherein when the elapse time is shorter than a predetermined time, the drive controlling portion sets the driving frequency at the drive start time to the stored resonance frequency.

2. An optical deflector comprising:
the movable body apparatus recited in claim 1; and
a light beam generator configured to generate a light beam,
wherein the movable body apparatus is provided with a mirror configured to reflect and to deflect the light beam from the light beam generator, the detecting portion includes an optical detector arranged to detect the deflected light beam at a predetermined deflection angle, and the resonance frequency is obtained based on a light beam detection time detected by the optical detector.

3. An optical instrument comprising:
the optical deflector recited in claim 2; and
an irradiation target object,
wherein the optical deflector deflects the light beam from the light beam generator, and directs at least a portion of the light beam to the irradiation target object.

4. A drive control method for performing drive control of a movable body apparatus including a vibratory system that has a resonance frequency, and includes at least a movable body capable of being reciprocally, rotatably oscillated, a detecting portion for detecting a resonance frequency of the vibratory system, a driving portion for driving the vibratory system, a drive controlling portion, a storing portion, and a measuring portion, said method comprising:
a step of driving the vibratory system based on a drive signal applied to the driving portion, the drive signal having a driving frequency;
a step of detecting the resonance frequency of the vibratory system with the detecting portion;
a step of regulating, with the drive controlling portion, the driving frequency of the drive signal applied to the driving portion based on the resonance frequency of the vibratory system;
a step of stopping, with the drive controlling portion, the application of the drive signal to the driving portion;
a step of storing in the storing portion the resonance frequency detected by the detecting portion;
a step of measuring, with the measuring portion, an elapse time from a drive signal stop time to a request for a drive start time; and
a step of redriving the vibratory system at the drive start time such that the driving frequency of the drive signal at the drive start time is set in accordance with the elapse time and the stored resonance frequency,
wherein when the elapse time is shorter than a predetermined period of time, the driving frequency at the drive start time is set to the stored resonance frequency.

* * * * *